(12) United States Patent
Aoki

(10) Patent No.: US 11,352,095 B2
(45) Date of Patent: Jun. 7, 2022

(54) FRONT FORK

(71) Applicant: Showa Corporation, Gyoda (JP)

(72) Inventor: Yasuhiro Aoki, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 493 days.

(21) Appl. No.: 16/321,371

(22) PCT Filed: Jan. 31, 2017

(86) PCT No.: PCT/JP2017/003464
§ 371 (c)(1),
(2) Date: Jan. 28, 2019

(87) PCT Pub. No.: WO2018/020710
PCT Pub. Date: Feb. 1, 2018

(65) Prior Publication Data
US 2019/0161137 A1    May 30, 2019

(30) Foreign Application Priority Data
Jul. 29, 2016    (JP) .............................. JP2016-150098

(51) Int. Cl.
*B62K 25/08*    (2006.01)
*F16F 9/44*    (2006.01)
(Continued)

(52) U.S. Cl.
CPC ................ *B62K 25/08* (2013.01); *F16F 9/32* (2013.01); *F16F 9/44* (2013.01); *F16F 9/58* (2013.01); *F16F 9/585* (2013.01)

(58) Field of Classification Search
CPC ..... B62K 25/08; F16F 9/32; F16F 9/44; F16F 9/58; F16F 9/585
(Continued)

(56) References Cited

U.S. PATENT DOCUMENTS

2007/0096376 A1    5/2007   Murakami
2010/0225081 A1*   9/2010   Galasso .................. F16F 9/185
                                                                280/124.1
(Continued)

FOREIGN PATENT DOCUMENTS

CN          2129260 Y       4/1993
CN          1939803 A       4/2007
(Continued)

OTHER PUBLICATIONS

Extended European Search Report dated Jun. 8, 2020 for the corresponding European Patent Application No. 17833722.6.
(Continued)

*Primary Examiner* — Anne Marie M Boehler
(74) *Attorney, Agent, or Firm* — Leason Ellis LLP

(57)    ABSTRACT

A front fork includes a first shock absorber and a second shock absorber disposed respectively on both sides of a vehicle wheel. The first shock absorber includes a set of tubes configured to slide relative to each other; damping force generation parts configured to generate a damping force in accordance with the sliding of the tubes; and a spring configured to urge the set of tubes in a stretching direction. The second shock absorber includes a set of tubes configured to slide relative to each other; and a coil spring configured to urge the set of tubes in the stretching direction.

7 Claims, 6 Drawing Sheets

(51) Int. Cl.
*F16F 9/58* (2006.01)
*F16F 9/32* (2006.01)
(58) Field of Classification Search
USPC .................................................. 280/276, 277
See application file for complete search history.

(56) References Cited

U.S. PATENT DOCUMENTS

| | | | | |
|---|---|---|---|---|
| 2012/0217686 | A1* | 8/2012 | Pelot | F16F 9/0209 267/64.15 |
| 2013/0154233 | A1 | 6/2013 | Amano et al. | |
| 2014/0175764 | A1 | 6/2014 | Murakami et al. | |
| 2014/0291090 | A1* | 10/2014 | Shimasaki | F16F 9/34 188/315 |
| 2017/0334503 | A1* | 11/2017 | Sintorn | F16F 9/3257 |
| 2018/0105225 | A1* | 4/2018 | Tomiuga | F16F 9/342 |

FOREIGN PATENT DOCUMENTS

| | | | | |
|---|---|---|---|---|
| JP | 8-142968 A | | 6/1996 | |
| JP | 2011-225198 A | | 11/2011 | |
| JP | 2012-067777 A | | 4/2012 | |
| JP | 2012-82850 A | | 4/2012 | |
| JP | A-2012-092945 A | | 5/2012 | |
| JP | 2012-117586 A | | 6/2012 | |
| JP | 2012177465 | * | 9/2012 | ............ F16F 9/0218 |
| JP | 2013-177081 A | | 9/2013 | |
| JP | 2014-122688 A | | 7/2014 | |
| WO | WO-2013051671 A1 | * | 4/2013 | ............ B62K 25/08 |
| WO | WO-2013066159 A1 | * | 5/2013 | ............ B62K 25/08 |

OTHER PUBLICATIONS

Chinese Office Action dated May 7, 2020 for the corresponding Chinese Patent Application No. 201780047286.0.
International Search Report dated Mar. 28, 2017 for the corresponding PCT International Patent Application No. PCT/JP2017/003464.
Written Opinion dated Mar. 28, 2017 for the corresponding PCT International Patent Application No. PCT/JP2017/003464.

* cited by examiner

FRONT FORK

CROSS-REFERENCE TO RELATED PATENT APPLICATIONS

This application is a U.S. National Phase Application under 35 U.S.C. § 371 of International Patent Application No. PCT/JP2017/003464, filed Jan. 31, 2017, and claims the benefit of Japanese Patent Applications No. 2016-150098, filed on Jul. 29, 2016, all of which are incorporated herein by reference in their entirety. The International Application was published in Japanese on Feb. 1, 2018 as International Publication No. WO/2018/020710 under PCT Article 21(2).

FIELD OF THE INVENTION

The disclosure relates to a front fork, and more particularly, to a front fork capable of improving the ride comfort.

BACKGROUND OF THE INVENTION

There is known a front fork in which a first shock absorber and a second shock absorber are arranged on both sides of a vehicle wheel, respectively (e.g., Japanese Unexamined Publication No. 2012-92945). In the front fork disclosed in Patent Document 1, the first shock absorber does not incorporate a coil spring but incorporates a damping force generation part, and the second shock absorber does not incorporate a coil spring and a damping force generation part but incorporates an air spring.

Problems to be Solved by Invention

In the technique disclosed in Japanese Unexamined Publication No. 2012-92945, there is a demand for improvement in ride comfort.

The disclosure has been made in order to meet the above-described demand and aims to provide a front fork capable of improving ride comfort.

SUMMARY OF THE INVENTION

Means for Solving the Problems

In order to achieve the above object, a front fork of the disclosure includes a first shock absorber and second shock absorber arranged on both sides of a vehicle wheel, respectively. In the first shock absorber, a first tube and a second tube sliding relative to each other are arranged on a vehicle body side and a vehicle wheel side, respectively. A damping force generation part generates a damping force in accordance with the sliding of the first tube and the second tube. A first spring having a coil spring urges the first tube and the second tube in a stretching direction.

In the second shock absorber, a third tube and a fourth tube sliding relative to each other are arranged on a vehicle body side and a vehicle wheel side, respectively. A second spring configured by a coil spring urges the third tube and the fourth tube in a stretching direction. The second shock absorber includes a second cylinder provided in the third tube, a second rod provided in the fourth tube, a second piston provided in the second rod and forming a first air chamber inside the second cylinder, and an annular seal member held on an outer peripheral surface of the second piston. The second cylinder has a second large-diameter portion having an inner peripheral surface with which the seal member is in sliding contact, and a second small-diameter portion which has an outer diameter smaller than an outer diameter of the second large-diameter portion and continues to the second large-diameter portion and the fourth tube side via a second stepped portion. The second spring is disposed between the fourth tube and the second stepped portion. When the second shock absorber is compressed, the pressure of the first air chamber becomes higher than the pressure of a second air chamber outside the first air chamber.

Effects of Invention

According to the front fork described in claim 1, the first spring of the first shock absorber and the second spring configured by the coil spring of the second shock absorber share a reaction force necessary for absorbing the impact. The stretching/contracting vibration accompanied by the absorption of the impact by the first spring and the second spring is damped by the damping force generated by the damping force generation part of the first shock absorber. Further, the sliding resistance between the second large-diameter portion of the second cylinder and the seal member held by the second piston can be suppressed, thereby improving ride comfort.

DETAILED DESCRIPTION OF THE INVENTION

First Embodiment

Figure 1:
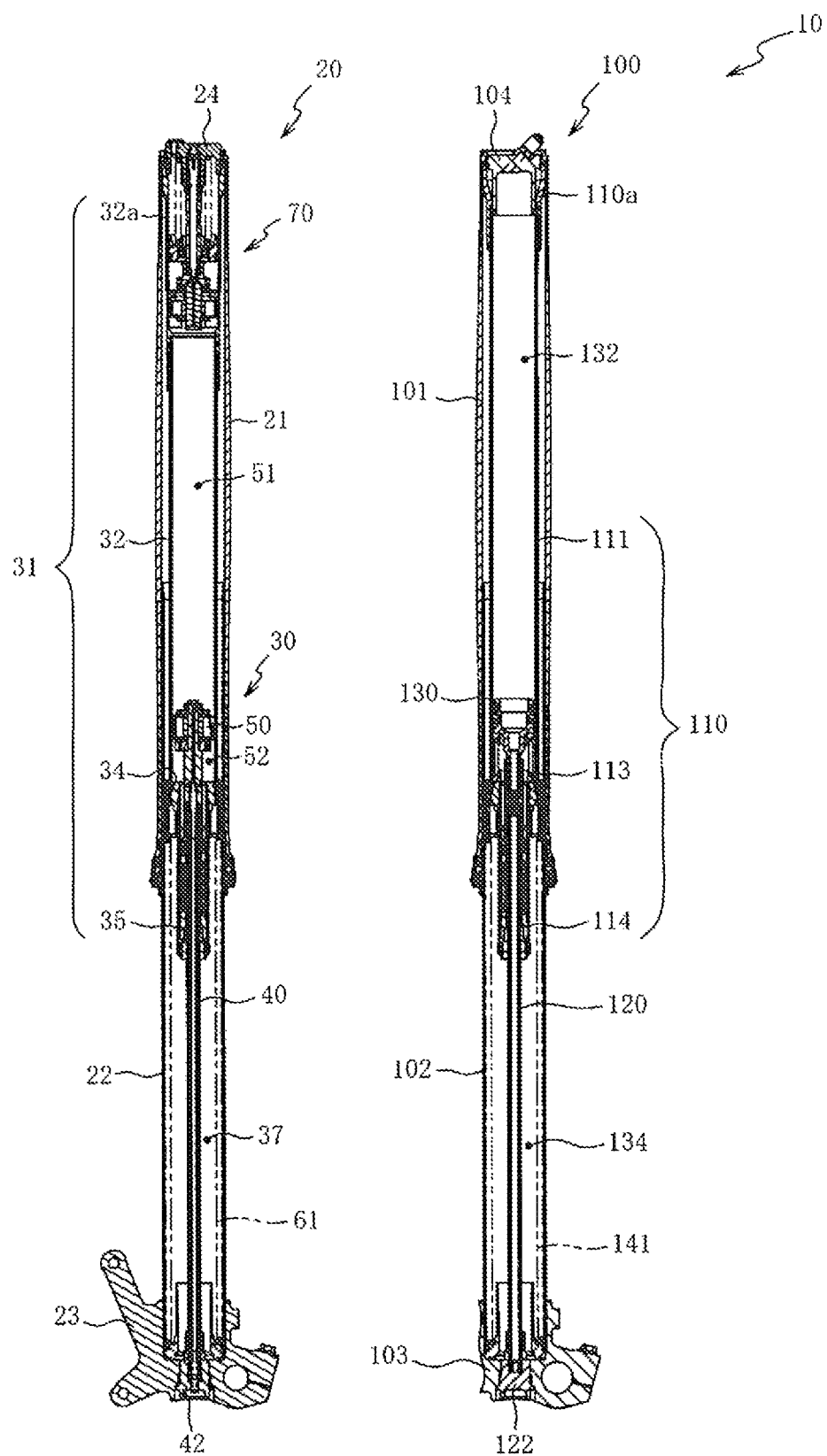
FIG. 1 is a sectional view of a front fork in a first embodiment.

Hereinafter, preferred embodiments of the disclosure will be described with reference to the accompanying drawings. First, a front fork 10 in a first embodiment of the disclosure will be described with reference to FIG. 1. FIG. 1 is a sectional view of the front fork 10 in the first embodiment. The front fork 10 is a device attached to both side surfaces of a wheel (not shown) of a motorcycle. The front fork 10 includes a first shock absorber 20 and a second shock absorber 100 arranged in parallel. The first shock absorber 20 incorporates a first damping force generation part 30 and a second damping force generation part 70 (damping force generation part). The second shock absorber 100 does not incorporate a damping force generation part, but incorporates a first air chamber 132 and a second spring 141 (coil spring).

The first shock absorber 20 is a telescopic type in which a second tube 22 extends into and from a first tube 21. The first shock absorber 20 includes the cylindrical first tube 21 connected to a vehicle body side bracket (not shown) and the cylindrical second tube 22 connected to a vehicle wheel side bracket 23. When an impact due to the unevenness of a road surface is inputted to a vehicle wheel (not shown), the second tube 22 extends into and from the first tube 21 to expand and contract the first shock absorber 20.

In the present embodiment, an inverted type first shock absorber 20 in which the second tube 22 on the side of the vehicle wheel extends into and from the first tube 21 on the side of the vehicle body will be explained. However, the disclosure is not limited thereto. It is naturally possible to adopt an upright type first shock absorber 20 in which the first tube 21 on the side of the vehicle body extends into and from the second tube 22 on the side of the vehicle wheel.

An opening of the upper end of the first tube 21 is closed by a fork bolt 24. The fork bolt 24 is inserted and screwed into an inner periphery of a cylinder 31 (first cylinder) via an O ring. In the first tube 21, the cylinder 31 is held in a state of being suspended by the fork bolt 24. The cylinder 31 has a cylindrical large-diameter portion 32 (first large-diameter portion) located on the upper portion of the cylinder 31, and a cylindrical small-diameter portion 35 (first small-diameter portion) continuing to the large-diameter portion 32 via a stepped portion 34 (first stepped portion).

The second tube 22 has a coil spring 61 (a part of the first coil spring) on the side closer to the bracket 23 than the stepped portion 34. The coil spring 61 is a spring for urging the first tube 21 and the second tube 22 in a stretching direction. A reservoir 37 is provided on the inner side of the first tube 21 and the second tube 22 and on the outer side of the cylinder 31.

The reservoir 37 has an oil chamber in which hydraulic oil is stored, and an air chamber in contact with the oil chamber via a free interface. Gas confined in the air chamber constitutes an air spring (a part of the first spring). The elastic force of the air spring of the air chamber of the reservoir 37 and the coil spring 61 absorbs the impact force that a vehicle receives from a road surface.

A bottom bolt 42 is screwed to the bracket 23 via an O ring. The bottom bolt 42 is screwed to a lower end of a rod 40. The rod 40 protrudes from the small-diameter portion 35 to the large-diameter portion 32 through the stepped portion 34 along its central axis to support a piston 50 (first piston). The piston 50 partitions the cylinder 31 into a piston side oil chamber 51 and a rod side oil chamber 52.

The second shock absorber 100 is a telescopic type in which a fourth tube 102 extends into and from a third tube 101. The second shock absorber 100 includes the cylindrical third tube 101 connected to a vehicle body side bracket (not shown) and the cylindrical fourth tube 102 connected to a vehicle wheel side bracket 103. When an impact due to the unevenness of a road surface is inputted to a vehicle wheel (not shown), the fourth tube 102 extends into and from the third tube 101 to expand and contract the second shock absorber 100.

In the present embodiment, an inverted type second shock absorber 100 in which the fourth tube 102 on the side of the vehicle wheel extends into and from the third tube 101 on the side of the vehicle body will be explained. However, the disclosure is not limited thereto. It is naturally possible to adopt an upright type second shock absorber 100 in which the third tube 101 on the side of the vehicle body extends into and from the fourth tube 102 on the side of the vehicle wheel.

An opening of the upper end of the third tube 101 is closed by a fork bolt 104. The fork bolt 104 is inserted and screwed to an inner periphery of a cylinder 110 (second cylinder) via an O ring. In the third tube 101, the cylinder 110 is held in a state of being suspended by the fork bolt 104 via a sleeve 110a. The cylinder 110 has a cylindrical large-diameter portion 111 (second large-diameter portion) located on the upper portion of the cylinder 110, and a cylindrical small-diameter portion 114 (second small-diameter portion) continuing to the large-diameter portion 111 via a stepped portion 113 (second stepped portion).

An opening of the lower end of the fourth tube 102 is closed by a bracket 103 and a bottom bolt 122. The bottom bolt 122 is screwed to a lower end of a rod 120. The rod 120 protrudes from the small-diameter portion 114 to the large-diameter portion 111 through the stepped portion 113 along its central axis to support a piston 130 (second piston).

The first air chamber 132 is formed in the large-diameter portion 111 by the piston 130, and a second air chamber 134 is formed on the inner side of the third tube 101 and the fourth tube 102 and on the outer side of the cylinder 110. Since the lubricating oil is stored in the lower portion of the fourth tube 102, the space (excluding the cylinder 110) above a liquid level (not shown) of the lubricating oil stored in the fourth tube 102 forms the second air chamber 134. The gas confined in the first air chamber 132 and the second air chamber 134 constitutes an air spring.

In the fourth tube 102, the second spring 141 is set on the side closer to the bracket 103 than the stepped portion 113. The second spring 141 is a metallic coil spring for urging the third tube 101 and the fourth tube 102 in a stretching direction. The elastic force of the air spring by the first air chamber 132 and the second air chamber 134 and the second spring 141 absorbs the impact force that a vehicle receives from a road surface.

The damping force generation part (the first damping force generation part 30 and the second damping force generation part 70) of the first shock absorber 20 generates a damping force for damping the expansion and contraction vibration due to the elastic force of the coil spring 61 and the air spring (the air chamber of the reservoir 37) of the first shock absorber 20 and the elastic force of the air spring by the first air chamber 132 and the second air chamber 134 and the second spring 141 of the second shock absorber 100.

In the front fork 10, the cylinder 31 having the large-diameter portion 32 and the small-diameter portion 35 is disposed in the first tube 21 of the first shock absorber 20, and the cylinder 110 having the large-diameter portion 111 and the small-diameter portion 114 is disposed in the third tube 101 of the second shock absorber 100 adjacent to the first shock absorber 20. Similarly, the rod 40 inserted into the cylinder 31 is disposed in the second tube 22, and the rod 120 inserted into the cylinder 110 is disposed in the fourth tube 102 adjacent to the second tube 22. As a result, it is easy to balance the rigidity of the first shock absorber 20 and the second shock absorber 100.

Particularly in the front view of the front fork 10, the height position of the stepped portion 34 of the first shock absorber 20 and the height position of the stepped portion 113 of the second shock absorber 100 are set to be the same, and the lengths of the small-diameter portions 35, 114 are made the same. The height position of a rod guide 36 (see FIG. 2) disposed in the small-diameter portion 35 and the height position of a rod guide 116 (see FIG. 4) disposed in the small-diameter portion 114 are similarly set to be the same. In this way, the rigidity of the first shock absorber 20 and the second shock absorber 100 is balanced, which makes it difficult for a handle to swing in a yaw direction when an external load (disturbance) is input.

Figure 2:
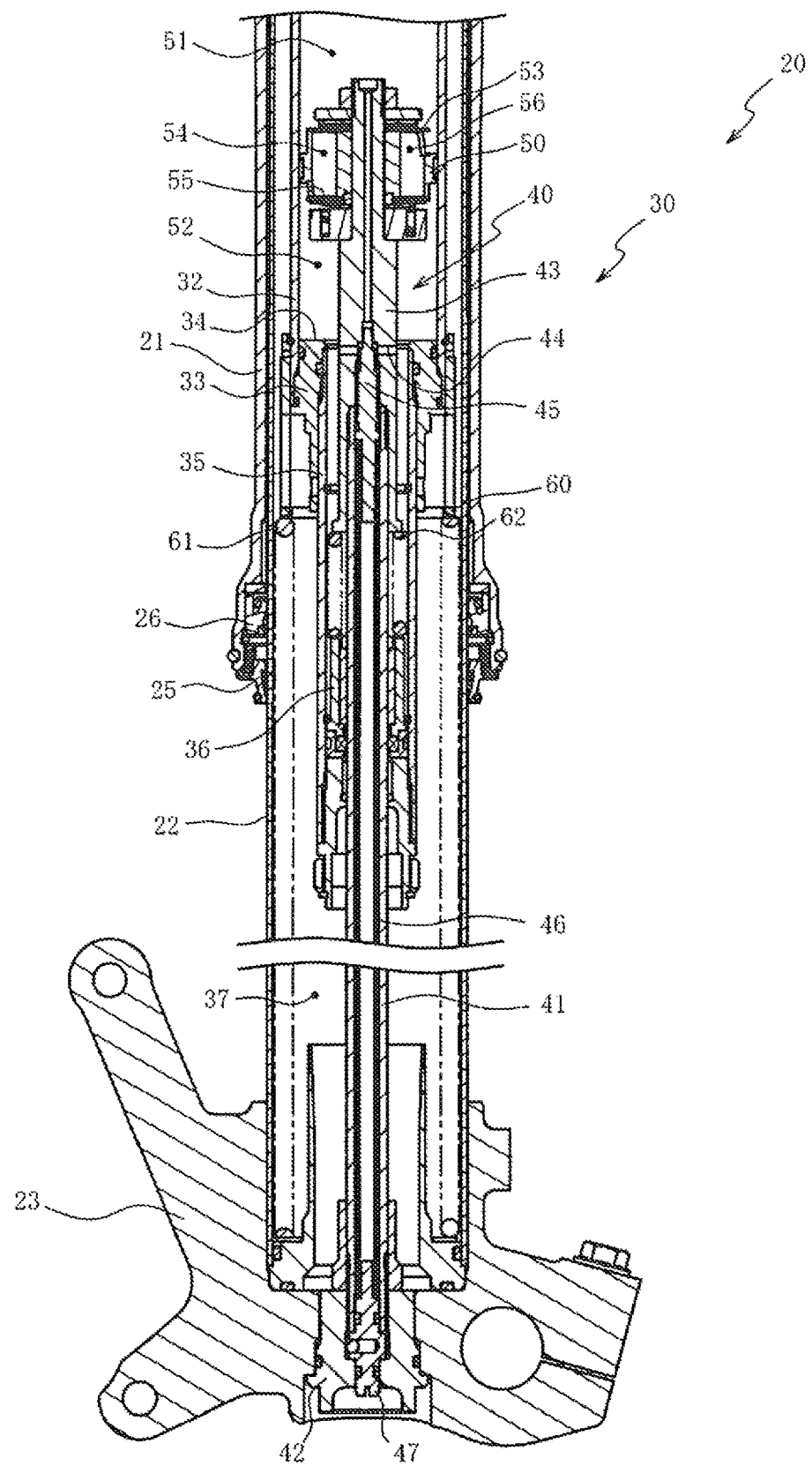
FIG. 2 is a sectional view of a first shock absorber on the side of a second tube.
Figure 3:
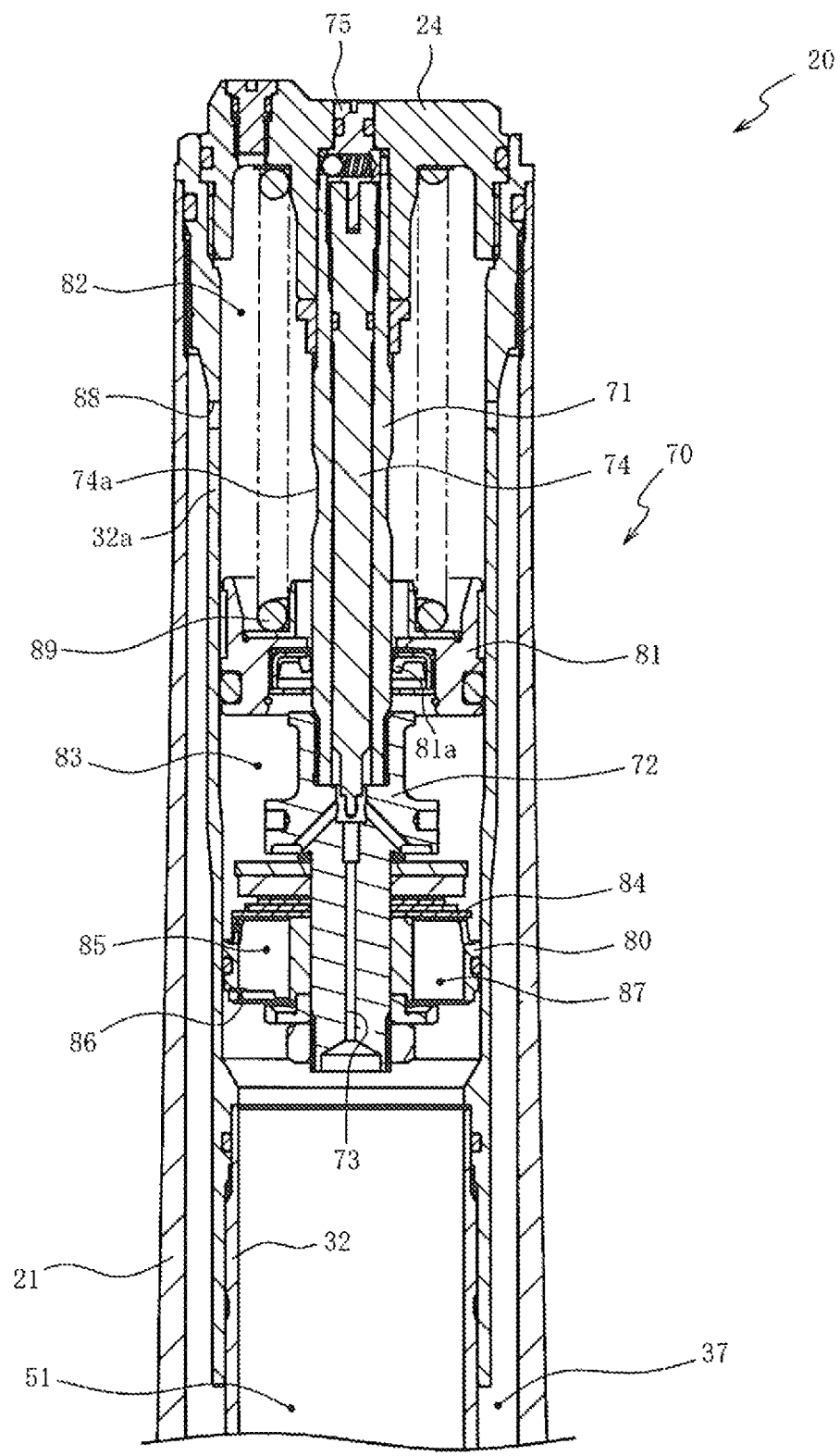
FIG. 3 is a sectional view of a first shock absorber on the side of a first tube.

Subsequently, the first shock absorber 20 and the second shock absorber 100 will be described with reference to FIGS. 1 to 4. First, the first shock absorber 20 will be described with reference to FIGS. 1 to 3. FIG. 2 is a sectional view of the first shock absorber 20 on the side of the second tube 22, and FIG. 3 is a sectional view of the first shock absorber 20 on the side of the first tube 21. In FIGS. 2 and 3, a part of the first shock absorber 20 in an axial direction is not shown.

As shown in FIG. 2, the first shock absorber 20 is configured such that an annular dust seal 25 and an annular oil seal 26 held on the inner periphery of the lower portion of the first tube 21 are in sliding contact with the outer peripheral surface of the second tube 22. The first damping force generation part 30 (damping force generation part) includes the cylinder 31 (see FIG. 1), the rod 40 and the piston 50. An annular connecting member 33 is attached to the inner periphery of the lower end of the large-diameter portion 32 of the cylinder 31 via an O ring. The connecting member 33 is a member for connecting the large-diameter portion 32 and the small-diameter portion 35. The stepped portion 34 is formed inside the large-diameter portion 32 by the axial end surface of the connecting member 33. The rod guide 36 is disposed inside the small-diameter portion 35.

The rod 40 includes a cylindrical main body 41 having a lower portion fixed to the bottom bolt 42, and a piston holder 43 fixed to the upper portion of the body 41. The piston 50 is attached to the piston holder 43. The piston 50 slides inside the large-diameter portion 32. The piston 50 partitions the large-diameter portion 32 into a piston side oil chamber 51 and a rod side oil chamber 52.

The piston 50 includes an extension side flow path 54 having an extension side damping valve 53 and communicating the oil chamber 51 with the oil chamber 52 when the extension side damping valve 53 is opened, and a compression side flow path 56 having a compression side damping valve 55 (check valve) and communicating the oil chamber 51 with the oil chamber 52 when the compression side damping valve 55 is opened. Hereinafter, the extension side damping valve 53 and the compression side damping valve 55 are referred to as the damping valve 53 and the damping valve 55, respectively. Further, the extension side flow path 54 and the compression side flow path 56 are referred to as the flow path 54 and the flow path 56, respectively.

A bypass path 44 communicating the oil chamber 51 with the oil chamber 52 is formed in the piston holder 43. A needle 45 facing the bypass path 44 is inserted into the piston holder 43. An adjustment rod 46 inserted into the main body 41 connects an adjuster 47 provided in the bottom bolt 42 and the needle 45. The adjustment rod 46 and the needle 45 move back and forth in an axial direction by the rotational operation of the adjuster 47 to adjust the flow path area of the bypass path 44.

In the present embodiment, a cylindrical spring receiver 60 is attached to the outer periphery of the connecting member 33. The spring receiver 60 has an axial end portion disposed on the outside of the small-diameter portion 35 in a radial direction. The coil spring 61 having a linear characteristic is interposed between the end portion of the spring receiver 60 and a bottom portion of the second tube 22 (outside the movable range of the piston 50).

A rebound spring 62 (first small-diameter spring) is interposed between the piston holder 43 and the rod guide 36 inside the small-diameter portion 35. The rebound spring 62 is a spring for generating a reaction force when the first tube 21 and the second tube 22 are maximally stretched. In the present embodiment, the rebound spring 62 is configured by a metallic coil spring. By effectively utilizing the space between the small-diameter portion 35 and the rod 40, it is possible to secure the arrangement space of the rebound spring 62. Since the rebound spring 62 is disposed, the impact when the first tube 21 and the second tube 22 are maximally stretched can be absorbed without affecting the damping characteristic of the first damping force generation part 30.

As shown in FIG. 3, the second damping force generation part 70 (damping force generation part) is disposed at the upper end of the first tube 21. The second damping force generation part 70 includes a guide pipe 71 attached to the fork bolt 24, a sub piston 80 fixed to the guide pipe 71, and a free piston 81 disposed above the sub piston 80. A reduced diameter portion 74a having a small outer diameter is formed in the vicinity of the center of the guide pipe 71 in the axial direction.

In the first tube 21, the guide pipe 71 is held in a state of being suspended by the fork bolt 24. A piston holder 72 is attached to a lower end of the guide pipe 71. The piston holder 72 holds the sub piston 80 disposed inside an upper end portion 32a. The upper end portion 32a is fixed to an upper end of the first tube 21 via an O ring by using the fork bolt 24. The upper end portion 32a is connected to an upper end of the large-diameter portion 32 located at the upper portion of the cylinder 31. The sub piston 80 partitions a sub-tank chamber 83 above the oil chamber 51 formed by the piston 50.

A bypass path 73 for communicating the oil chamber 51 with the sub-tank chamber 83 is formed in the piston holder 72. A needle formed at a leading end of an adjustment rod 74 is disposed at a position facing the bypass path 73. The adjustment rod 74 is inserted into the guide pipe 71. The adjustment rod 74 is connected to an adjuster 75 provided in the fork bolt 24. The adjustment rod 74 moves back and forth in the axial direction by the rotational operation of the adjuster 75 to adjust the flow path area of the bypass path 73.

The sub piston 80 includes a compression side flow path 85 having a compression side damping valve 84 and communicating the oil chamber 51 with the sub-tank chamber 83 when the compression side damping valve 84 is opened, and an extension side flow path 87 having an extension side damping valve 86 (check valve) and communicating the oil chamber 51 with the sub-tank chamber 83 when the extension side damping valve 86 is opened. Hereinafter, the compression side damping valve 84 and the extension side damping valve 86 are referred to as the damping valve 84 and the damping valve 86, respectively. Further, the compression side flow path 85 and the extension side flow path 87 are referred to as the flow path 85 and flow path 87, respectively.

The free piston 81 is disposed at an annular space between the upper end portion 32a and the guide pipe 71. The free piston 81 partitions the space above the sub piston 80 into the sub-tank chamber 83 communicating with the oil chamber 51 and a gas chamber 82. The free piston 81 holds a packing 81a in sliding contact with the guide pipe 71 on its inner periphery.

A pressurizing spring 89 is disposed between the free piston 81 and the fork bolt 24. The pressurizing spring 89 is configured by a compression coil spring and urges the free piston 81 toward the sub piston 80. The gas chamber 82 communicates with the air chamber of the reservoir 37 by a through-hole 88 penetrating the upper end portion 32a. The gas chamber 82 and the pressurizing spring 89 are parts of a first spring for urging the first tube 21 and the second tube 22 in the stretching direction via the sub-tank chamber 83.

The first shock absorber 20 is configured such that hydraulic oil (the hydraulic oil within the oil chamber of the reservoir 37) attached to the outer peripheral surface of the rod 40 is introduced into the cylinder 31 each time the rod 40 strokes. In this way, the hydraulic oil in the oil chamber 51, the oil chamber 52 and the sub-tank chamber 83 inside the cylinder 31 gradually increases, and the pressure in the oil chamber 51, the oil chamber 52 and the sub-tank chamber 83 gradually increases. As the pressure in the sub-tank chamber 83 increases, the free piston 81 rises beyond the normal movement range and the packing 81a rises to the position of the reduced diameter portion 74a. Thus, the hydraulic oil in the sub-tank chamber 83 passes between the reduced diameter portion 74a and the packing 81a and enters the gas chamber 82. Excess hydraulic oil entering the gas chamber 82 is discharged to the reservoir 37 through the through-hole 88.

Figure 4:
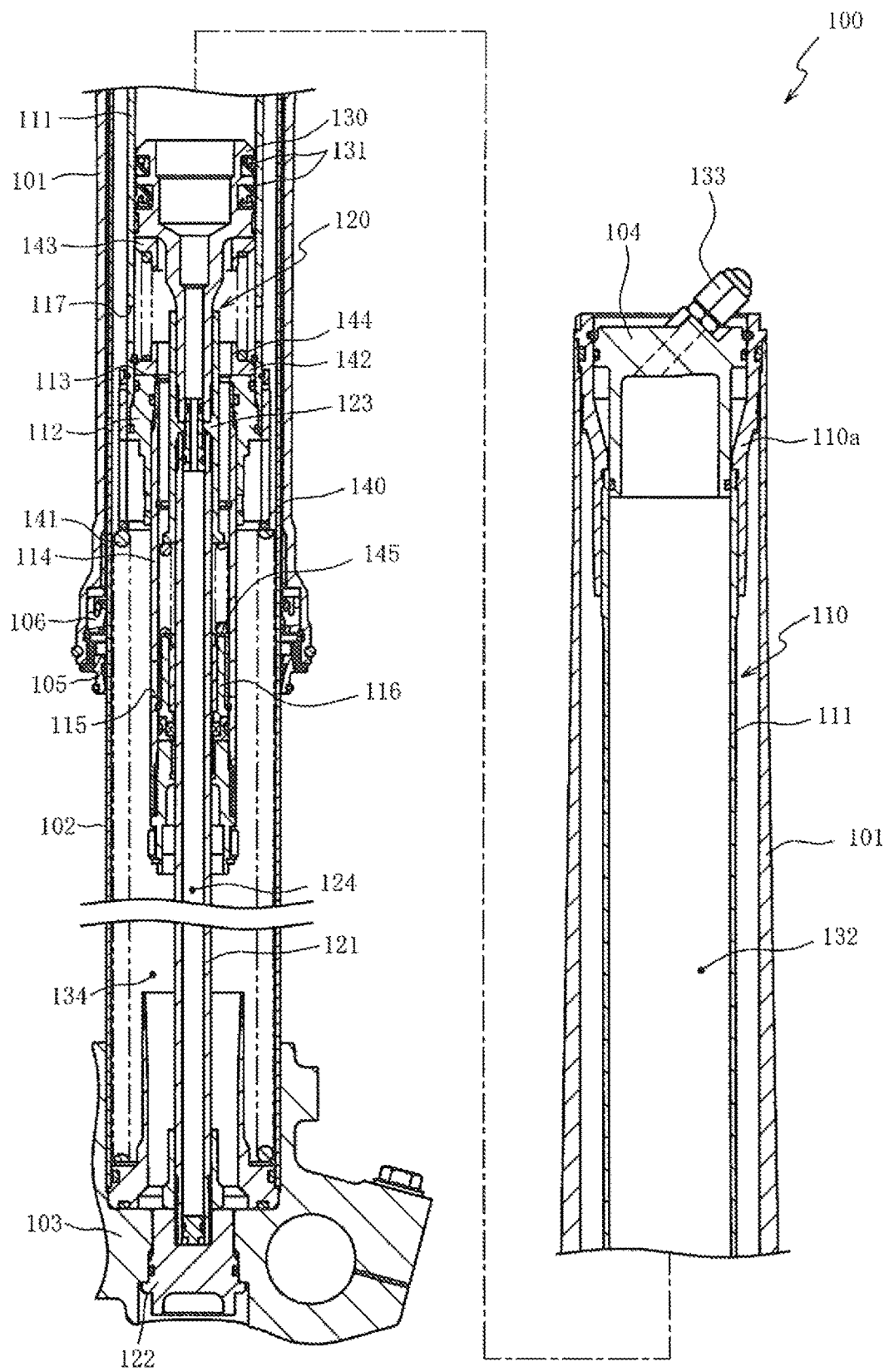
FIG. 4 is a sectional view of a second shock absorber.

Next, the second shock absorber 100 will be described with reference to FIG. 4. FIG. 4 is a sectional view of the second shock absorber 100. In FIG. 4, a part of the second shock absorber 100 in the axial direction is not shown. The second shock absorber 100 is configured such that an annular dust seal 105 and an annular oil seal 106 held on the inner periphery of the lower portion of the third tube 101 are in sliding contact with the outer peripheral surface of the fourth tube 102.

An annular connecting member 112 is attached to the inner periphery of the lower end of the large-diameter portion 111 of the cylinder 110 via an O ring. The connecting member 112 is a member for connecting the large-diameter portion 111 with the small-diameter portion 114. The stepped portion 113 is formed inside the large-diameter portion 111 by the axial end surface of the connecting member 112. A communicating hole 115 is formed at the lower portion of the small-diameter portion 114. The communicating hole 115 penetrates the side surface of the small-diameter portion 114 in a radial direction. The rod guide 116 is disposed inside the small-diameter portion 114.

The rod 120 includes a cylindrical main body 121 having a lower portion fixed to the bottom bolt 122 and supported by the rod guide 116, and a piston holder 123 fixed to the upper portion of the main body 121. The piston 130 is attached to the piston holder 123 having a cylindrical shape. The piston 130 holds an annular seal member 131 in sliding contact with the inner peripheral surface of the large-diameter portion 111 on its outer peripheral surface. Compressed gas is sealed in the first air chamber 132 and the second air chamber 134 partitioned by the piston 130. The second air chamber 134 communicates with the inside of the small-diameter portion 114 by the communicating hole 115.

An expansion chamber 124 is formed inside the main body 121 of the rod 120 along its axial direction. The expansion chamber 124 communicates with the first air chamber 132 via a hole penetrating the piston 130 and the piston holder 123 in the axial direction. Therefore, the volume of the first air chamber 132 can be increased by the volume of the expansion chamber 124. A valve 133 for supplying/discharging gas to/from the first air chamber 132 is disposed in the fork bolt 104.

Compressed gas is sealed in the first air chamber 132 and the second air chamber 134. The pressure of the first air chamber 132 is set to be higher than that of the second air chamber 134. The second air chamber 134 is in almost normal pressure. Here, it is naturally possible to pressurize the second air chamber 134 as necessary.

The compressed gas in the first air chamber 132 and the second air chamber 134 functions as an air spring that exerts a reaction force corresponding to the compression amount of the third tube 101 and the fourth tube 102. This air spring functions as a suspension spring that constantly urges the third tube 101 and the fourth tube 102 in the stretching direction to elastically support a vehicle body. Since the compression amounts of the third tube 101 and the fourth tube 102 are equal to the compression amount of the second shock absorber 100, it can be said that the air spring exerts a reaction force corresponding to the compression amount of the second shock absorber 100 and urges the second shock absorber 100 in the stretching direction.

The second shock absorber 100 can expand the volume of the first air chamber 132 by the volume of the expansion chamber 124. When the volume of the first air chamber 132 is expanded, it is possible to suppress the change in the rising of the reaction force at the second half of the stroke when the first air chamber 132 is compressed.

A cylindrical spring receiver 140 is attached to the outer periphery of the connecting member 112. The spring receiver 140 has an axial end portion disposed on the outside of the small-diameter portion 114 in the radial direction. The second spring 141 (coil spring) is interposed between the end portion of the spring receiver 140 and a bottom portion of the fourth tube 102. The second spring 141 is a compression spring for urging the third tube 101 and the fourth tube 102 in the stretching direction. The second spring 141 exerts a reaction force corresponding to the compression amount of the second shock absorber 100. Since the air spring by the first air chamber 132 and the second air chamber 134 is used in combination with the second spring 141 (coil spring) having a linear characteristic, the reaction force of an area insufficient just with the air spring can be compensated.

Since the second spring 141 is disposed on the side closer to the fourth tube 102 than the large-diameter portion 111, the large-diameter portion 111 is hardly restricted by the radial space in which the second spring 141 is disposed. As a result, the dimensions of the outer diameter and the inner diameter of the large-diameter portion 111 can be appropriately set independently of the second spring 141. Since the pressure of the first air chamber 132 for obtaining the same reaction force is inversely proportional to the sectional area of the large-diameter portion 111, the pressure of the first air chamber 132 for obtaining the same reaction force can be lowered by appropriately setting the dimension of the inner diameter of the large-diameter portion 111 independently of the second spring 141. In this way, the sliding resistance between the cylinder 110 (the large-diameter portion 111) and the piston 130 (the seal member 131) can be reduced while securing the reaction force.

Spring receivers 142, 143 are disposed on the opposing surfaces of the piston 130 and the connecting member 112. The position in the axial direction of the spring receiver 142 is restricted in a state where it abuts against the connecting member 112. The spring receivers 142, 143 hold an end terminal of a balance spring 144. The balance spring 144 is a spring for urging the third tube 101 and the fourth tube 102 in a compression direction. The balance spring 144 cancels the reaction force caused by the first air chamber 132 and the second air chamber 134 when the third tube 101 and the fourth tube 102 are compressed from the most stretched position.

In the present embodiment, the balance spring 144 is configured by a metallic coil spring. When the balance spring 144 is disposed, the reaction force caused by the compression of the first air chamber 132 and the second air chamber 134 is cancelled, and it is possible to reduce the load at the initial time of the stoke in which the third tube 101 and the fourth tube 102 are expanded and contracted.

Since the spring receivers 142, 143 are disposed on the opposing surfaces of the piston 130 and the connecting member 112, the fixing structure of the spring receivers 142, 143 can be simplified. Since the spring receivers 142, 143 hold the end terminal of the balance spring 144 and the position in the axial direction of the spring receiver 142 is restricted, the balance spring 144 can be prevented from rubbing against the inner peripheral surface of the large-diameter portion 111. As a result, the inner peripheral surface of the large-diameter portion 111 can be prevented from being scratched by the balance spring 144.

A communication hole 117 is formed in the large-diameter portion 111 in the vicinity of the stepped portion 113 (the area between the piston 130 and the connecting member 112). Lubricating oil (not shown) stored in the second air chamber 134 can be introduced into the large-diameter portion 111 from the communication hole 117. Since the balance spring 144 is disposed at the position of the communication hole 117, the friction of the balance spring 144 can be reduced by the lubricating oil introduced into the large-diameter portion 111 from the communication hole 117. The lubricating oil introduced into the large-diameter portion 111 from the communication hole 117 lubricates the seal member 131.

A rebound spring 145 (second small-diameter spring) is interposed between the piston holder 123 and the rod guide 116 inside the small-diameter portion 114. The rebound spring 145 is a spring for generating a reaction force when the third tube 101 and the fourth tube 102 are maximally stretched. In the present embodiment, the rebound spring 145 is configured by a metallic coil spring. By effectively utilizing the space between the small-diameter portion 114 and the rod 120, it is possible to secure the arrangement space of the rebound spring 145.

Since the rebound spring 145 is disposed, the impact when the third tube 101 and the fourth tube 102 are maximally stretched can be absorbed without affecting the spring characteristic when the third tube 101 and the fourth tube 102 are compressed. Further, since the rebound spring 145 can use the same spring as the rebound spring 62 disposed in the first shock absorber 20, the parts thereof can be used in common.

Since the small-diameter portion 114 in which the rebound spring 145 is accommodated communicates with the second air chamber 134 by the communication hole 115, it is possible to prevent the inside of the small-diameter portion 114 from becoming high pressure when the third tube 101 and the fourth tube 102 are maximally stretched. Therefore, it is possible to prevent the sliding resistance of the seal member 131 (in particular, on the side of the small-diameter portion 114) from being increased when the third tube 101 and the fourth tube 102 are maximally stretched.

Lubricating oil (not shown) stored in the second air chamber 134 can be introduced into the small-diameter portion 114 from the communication hole 115. Since the rebound spring 145 is disposed at the position of the communication hole 115, the friction of the rebound spring 145 can be reduced by the lubricating oil introduced into the small-diameter portion 114 from the communication hole 115.

In the front fork 10, the coil spring 61 disposed in the first shock absorber 20 and the second spring 141 disposed in the second shock absorber 100 share a reaction force necessary for absorbing the impact. Therefore, the reaction force accompanied by the compression of the front fork 10 is the resultant force of the coil spring 61 and the second spring 141. By utilizing a plurality of springs, a compression coil spring having a small spring constant can be adopted for the coil spring 61 and the second spring 141, as compared to a case where impact is absorbed by using a spring disposed in either the first shock absorber or the second shock absorber. In order to reduce the spring constant, it is effective to reduce the diameter (the wire diameter of the coil spring) of the material of the coil spring 61 and the second spring 141. In this way, the mass of the coil spring 61 and the second spring 141 can be reduced.

In the first shock absorber 20, the coil spring 61 is disposed on the side opposite to the large-diameter portion 32 in the axial direction while avoiding the large-diameter portion 32 of the cylinder 31. Further, in the second shock absorber 100, the second spring 141 is disposed on the side opposite to the large-diameter portion 111 in the axial direction while avoiding the large-diameter portion 111 of the cylinder 110. Since the lengths of the coil spring 61 and the second spring 141 can be shortened so as not to interfere with the large-diameter portions 32, 111, the weights of the coil spring 61 and the second spring 141 can be accordingly reduced.

Here, since the load of the coil spring (the coil spring 61 and the second spring 141) having a linear characteristic is proportional to the deflection, the maximum loads of the coil spring 61 and the second spring 141 are reduced when the lengths of the coil spring 61 and the second spring 141 are shortened. However, in the front fork 10, in addition to the air springs of the first shock absorber 20 and the second shock absorber 100, the coil spring 61 and the second spring 141 share the load. Therefore, the impact force can be absorbed by the resultant force of the coil spring 61 and the second spring 141 arranged in parallel and the air springs.

The damping force generation part (the first damping force generation part 30 and the second damping force generation part 70) of the first shock absorber 20 damps the vibrations of the air spring, the coil spring 61 and the second spring 141. In the first damping force generation part 30, the coil spring 61 is set to the side closer to the second tube 22 than the large-diameter portion 32. Therefore, the large-diameter portion 32 is hardly restricted by the radial space in which the coil spring 61 is disposed. As a result, the sectional area of the large-diameter portion 32 can be increased, thereby increasing the flow rate of the hydraulic oil of the damping force generation part (the first damping force generation part 30 and the second damping force generation part 70) with respect to the stroke of the rod 40. In this way, the damping force caused by the damping force generation part can be easily and stably generated, so that the stability of the damping force can be improved.

In the second shock absorber 100, the piston 130 is in sliding contact with the large-diameter portion 111 of the cylinder 110, so that the sectional area of the piston 130 can be increased, as compared with a cylinder that does not have the large-diameter portion 111. Therefore, when the same reaction force (cylinder force) is obtained, the pressure of the first air chamber 132 partitioned by the piston 130 can be lowered. As a result, the reaction force of the air spring in the first half of the stroke can be reduced. The pressure of the first air chamber 132 is decreased by providing the large-diameter portion 111, so that the rate of increase of the load with respect to the stroke can be moderated. Since the rising of the load in the first half of the stroke can be moderated, the ride comfort can be improved.

When the pressure of the first air chamber 132 is decreased, there is a possibility that the reaction force of the air spring in the second half of the stroke is insufficient. The insufficient reaction force can be compensated by the coil spring 61 and the second spring 141. Since the spring constants of the coil spring 61 and the second spring 141 can be made small, the rate of increase of the load with respect to the stroke can be moderated. Therefore, it is possible to appropriately secure the reaction force in the second half of the stroke.

Furthermore, since the pressure of the first air chamber 132 can be decreased, an abrupt increase in the reaction force of the air spring at the end of the stroke can be suppressed. In addition to the air springs of the first shock absorber 20 and the second shock absorber 100, the coil spring 61 and the second spring 141 share the load. Therefore, the maximum load can be secured. In this way, the stability of the damping force and the ride comfort of the vehicle can be improved while securing the maximum load.

Meanwhile, in the second shock absorber 100, the pressure of the first air chamber 132 can be decreased, so that the sliding resistance between the cylinder 110 (the large-diameter portion 111) and the piston 130 (the seal member 131) can be decreased. As a result, the ride comport can be improved. Further, when the sliding resistance is decreased, the movement start of the piston 130 can be made smooth. Therefore, it is possible to alleviate the sense of incompatibility when the front fork 10 starts expansion and contraction.

When the pressure of the first air chamber 132 is decreased, the seal member 131 is not required to have high airtightness, and thus, the cost of the seal member 131 can be reduced. Further, when the pressure of the first air chamber 132 is decreased, the gas enclosed in the first air chamber 132 is less likely to leak from the seal member 131, and thus, a decrease in the reaction force (cylinder force) over time due to the leakage of the gas can be suppressed.

Furthermore, in the second shock absorber 100, the reaction force caused by the compression of the first air chamber 132 and the second air chamber 134 can be cancelled by the balance spring 144. Since the load at the initial time of the stroke can be reduced, the ride comfort can be improved.

Figure 5:
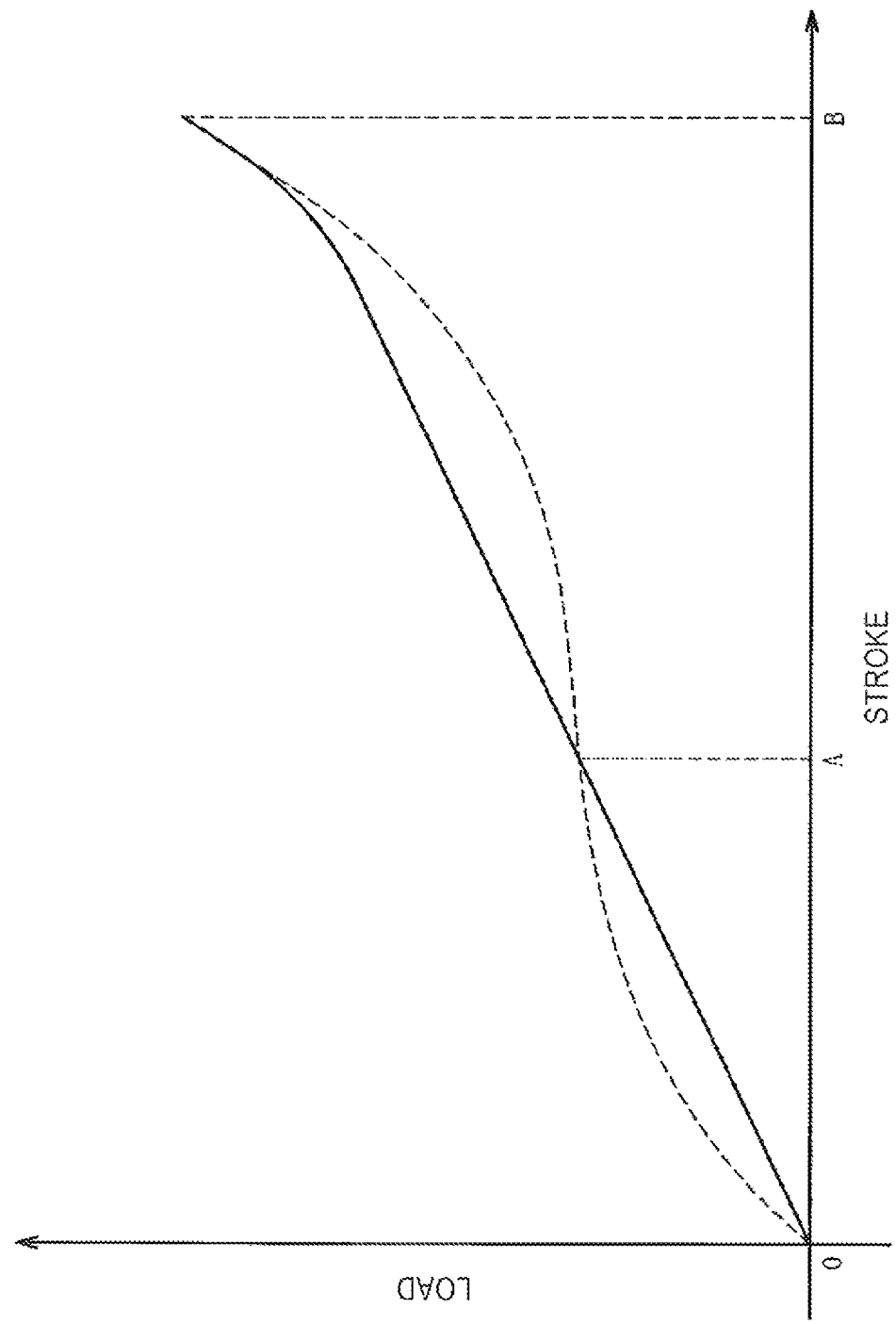
FIG. 5 is a load-stroke diagram of the front fork.

The load with respect to the stroke of the front fork 10 will be described with reference to FIG. 5. FIG. 5 is a load-stroke diagram of the front fork 10. In FIG. 5, the broken line is a load-stroke diagram of the front fork (hereinafter, referred to as "conventional product") disclosed in Japanese Unexamined Publication No. 2012-92945, and the solid line is a load-stroke diagram of the front fork (hereinafter, referred to as "invention product") in the first embodiment. In the front fork (conventional product) disclosed in Japanese Unexamined Publication No. 2012-92945, the first shock absorber does not incorporate a coil spring but incorporates a damping force generation part, and the second shock absorber does not incorporate a coil spring and a damping force generation part but incorporates an air spring.

In FIG. 5, the horizontal axis represents the stroke, and the vertical axis represents the load. In the horizontal axis, 0<stroke≤A represents a stroke in a normal use area such as when travelling on a general road, and B represents a stroke at the time of maximum compression. In the invention product, the air cylinder (the cylinder 110 and the piston 130), the coil spring 61 and the second spring 141 share the load. Therefore, when 0<stroke<A (normal use area), the load in the invention product can be made smaller (softer) than the conventional product. Further, in the invention product, when A<stroke<B, stability can be improved by increasing (hardening) the load than the conventional product. Since the load-stroke characteristic of the invention product can be brought closer to the linear characteristic than the conventional product, the ride comfort can be improved.

Second Embodiment

Figure 6:
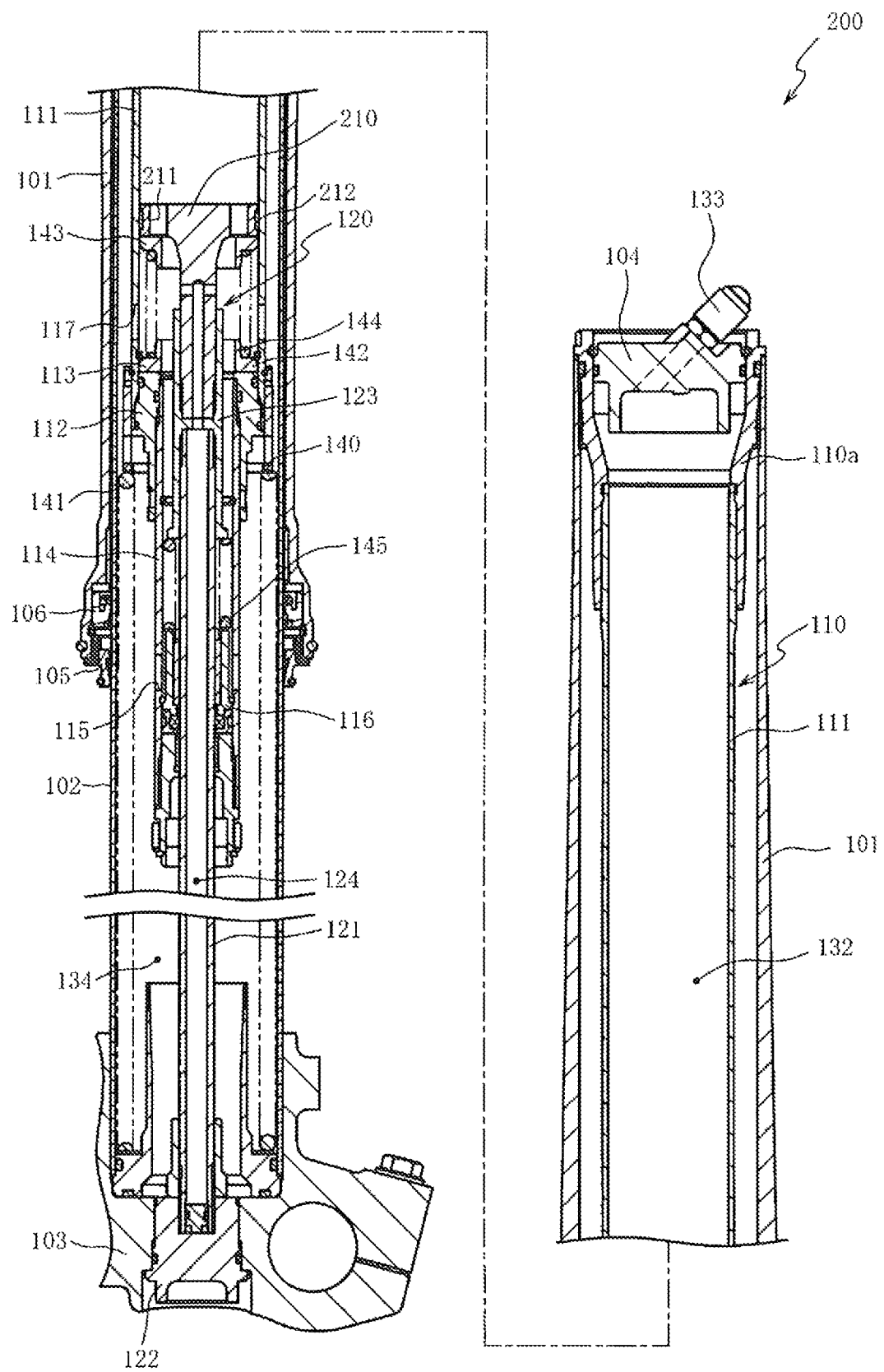
FIG. 6 is a sectional view of a second shock absorber of a front fork in a second embodiment.

Next, a second embodiment will be described with reference to FIG. 6. In the first embodiment, the case where the first air chamber 132 and the second air chamber 134 of the second shock absorber 100 are kept airtight by the seal member 131 held by the piston 130 has been described. On the contrary, in the second embodiment, a second shock absorber 200 in which the first air chamber 132 and the second air chamber 134 communicate with each other will be described. Meanwhile, the same parts as those described in the first embodiment are denoted by the same reference numerals, and the description thereof will be omitted. FIG. 6 is a sectional view of the second shock absorber 200 of the front fork in the second embodiment. The second shock absorber 200 is arranged next to the first shock absorber 20, in place of the second shock absorber 100 of the front fork 10 described in the first embodiment.

As shown in FIG. 6, in the second shock absorber 200, a piston 210 (second piston) is attached to the piston holder 123. A through-hole 211 penetrating in the axial direction is formed in the piston 210. A bushing 212 held on the outer periphery of the piston 210 is in sliding contact with the inner peripheral surface of the large-diameter portion 111. The through-hole 211 is a hole for communicating the first air chamber 132 with the second air chamber 134 via the communication hole 117 formed in the large-diameter portion 111.

The gas enclosed in the space (the first air chamber 132 and the second air chamber 134) surrounded by the third tube 101 and the fourth tube 102 functions as an air spring that exerts a reaction force corresponding to the compression amount of the third tube 101 and the fourth tube 102. This air spring functions as a suspension spring that constantly urges the third tube 101 and the fourth tube 102 in the stretching direction to elastically support a vehicle body. Since the compression amounts of the third tube 101 and the fourth tube 102 are equal to the compression amount of the second shock absorber 200, it can be said that the air spring exerts a reaction force corresponding to the compression amount of the second shock absorber 200 and urges the second shock absorber 200 in the stretching direction.

According to the front fork including the second shock absorber 200, the seal member (packing) for keeping the first air chamber 132 airtight is omitted. Therefore, as compared with the first embodiment, the resistance when the piston 210 moves in the cylinder 110 can be reduced. Further, since the seal member (packing) can be omitted, the cost required for the seal member can be reduced.

In the second embodiment, the damping force generation part (the first damping force generation part 30 and the second damping force generation part 70) of the first shock absorber 20 generates a damping force for damping the expansion and contraction vibration caused by the air spring (the first air chamber 132 and the second air chamber 134) and the second spring 141 of the second shock absorber 200 and the air spring (the air chamber of the reservoir 37) and the coil spring 61 of the first shock absorber 20. In this way, similar to the first embodiment, the springs provided in each of the first shock absorber 20 and the second shock absorber 200 share a reaction force necessary for absorbing the impact, so that the ride comfort can be improved. Further, the damping force caused by the damping force generation part can be easily and stably generated by the large-diameter portion 32 of the cylinder 31, so that the stability of the damping force can be improved.

Although the disclosure has been described on the basis of the embodiments, the disclosure is not limited to the above embodiments at all, and it can be inferred that various changes and modifications can be easily made without departing from the spirit of the disclosure.

For example, in each of the above embodiments, the case where the first tube 21 and the third tube 101 are disposed on the vehicle body side and the second tube 22 and the fourth tube 102 are disposed on the vehicle wheel side has been described. However, the disclosure is not necessarily limited thereto. It is naturally possible that the first tube 21 and the third tube 101 are disposed on the vehicle wheel side and the second tube 22 and the fourth tube 102 are disposed on the vehicle body side. Also in this case, the first tube 21 in which the cylinder 31 is disposed and the third tube 101 in which the cylinder 110 is disposed can be provided at positions adjacent to each other.

Meanwhile, when the first tube 21 in which the cylinder 31 is disposed and the third tube 101 in which the cylinder 110 is disposed are not provided at positions adjacent to each other, the arrangement of the tubes can be appropriately set, such as providing the first tube 21 on the vehicle body side and providing the third tube 101 on the vehicle wheel side.

The damping force generation part (the first damping force generation part 30 and the second damping force generation part 70) incorporated in the first shock absorber 20 described in each of the above embodiments is an example. It is naturally possible to employ another damping force generation part in place of the first damping force generation part 30 and the second damping force generation part 70.

In each of the above embodiments, the case where the first spring for urging the first shock absorber 20 in the stretching direction includes the coil spring 61 has been described. However, the disclosure is not necessarily limited thereto. It is naturally possible to omit the coil spring 61. Further, it is naturally possible that, in place of the coil spring 61, an air chamber is provided inside (outside the movable range of the piston 50) the first shock absorber 20 and the gas enclosed in the air chamber is caused to function as an air spring (a part of the first spring). In this case, since the coil spring 61 can be omitted, the weight of the first shock absorber 20 can be reduced as much as the coil spring is omitted.

In each of the above embodiments, the case where the rebound spring 145 is disposed in the small-diameter portion 114 of each of the second shock absorbers 100, 200 and the balance spring 144 is disposed in the large-diameter portion 111 has been described. However, the disclosure is not necessarily limited thereto. It is naturally possible that the rebound spring and the balance spring are replaced with each other, the balance spring is disposed in the small-diameter portion 114 and the rebound spring is disposed in the large-diameter portion 111.

REFERENCE NUMERALS LIST

10 Front Fork
20 First Shock Absorber
21 First Tube
22 Second Tube
30 First Damping Force Generation Part (Damping Force Generation Part)
31 Cylinder (First Cylinder)
32 Large-diameter Portion (First Large-diameter Portion)
34 Stepped Portion (First Stepped Portion)
35 Small-diameter Portion (First Small-diameter Portion)
37 Reservoir (Part of First Spring)
40 Rod (First Rod)
50 Piston (First Piston)
61 Coil Spring (Part of First Spring)
62 Rebound Spring (First Small-diameter Spring)
70 Second Damping Force Generation Part (Damping Force Generation Part)
82 Gas Chamber (Part of First Spring)
89 Pressurizing Spring (Part of First Spring)
100, 200 Second Shock Absorber
101 Third Tube
102 Fourth Tube
110 Cylinder (Second Cylinder)
111 Large-diameter Portion (Second Large-diameter Portion)
113 Stepped Portion (Second Stepped Portion)
114 Small-diameter Portion (Second Small-diameter Portion)
120 Rod (Second Rod)
130, 210 Piston (Second Piston)
132 First Air Chamber (Air Chamber)
141 Second Spring
145 Rebound Spring (Second Small-diameter Spring)

The invention claimed is:

1. A front fork comprising:
a first shock absorber and a second shock absorber disposed respectively on both sides of a vehicle wheel,
wherein the first shock absorber comprises:
a first tube and a second tube which are disposed respectively on a vehicle body side and a vehicle wheel side and which are configured to slide relative to each other;
a first cylinder provided in the first tube;
a damping force generation part configured to generate a damping force in accordance with a sliding of the first tube and the second tube; and
a first spring having a coil spring configured to urge the first tube and the second tube in a stretching direction,
wherein the second shock absorber comprises:
a third tube and a fourth tube which are disposed respectively on the vehicle body side and the vehicle wheel side and which are configured to slide relative to each other;
a second spring made of a coil spring configured to urge the third tube and the fourth tube in a stretching direction; and
a second cylinder provided in the third tube, said second cylinder having a second large-diameter portion, and a second small-diameter portion which has an outer diameter smaller than an outer diameter of the second large-diameter portion;
wherein a first air chamber is formed in the second cylinder, and
wherein a pressure of the first air chamber is set to be higher than a pressure of a second air chamber which is surrounded by the third tube and the fourth tube and which is located outside the first air chamber.

2. The front fork according to claim 1,
wherein the second shock absorber comprises a small-diameter spring which is disposed inside the second small-diameter portion and which is configured to urge the third tube and the fourth tube in a compression direction.

3. The front fork according to claim 1,
wherein the first shock absorber comprises:
a first rod provided in the second tube; and
a first piston which is supported by the first rod, which is configured to be in sliding contact with an inner peripheral surface of the first cylinder and which forms an oil chamber of the damping force generation part between the first cylinder and the first piston, wherein the first spring is disposed outside a movable range of the first piston, and wherein the second shock absorber further comprises:
  a second rod provided in the fourth tube;
  a second piston that is supported by the second rod and forms the first air chamber inside the second cylinder; and
  an annular seal member held on an outer peripheral surface of the second piston.

4. The front fork according to claim 3,
wherein the first cylinder comprises:
  a first large-diameter portion with which the first piston is in sliding contact; and
  a first small-diameter portion which has an outer diameter smaller than an outer diameter of the first large-diameter portion and which continues to the first large-diameter portion and a second tube side via a first stepped portion,
wherein the coil spring of the first spring is disposed between the second tube and the first stepped portion,
wherein the second large-diameter portion has an inner peripheral surface with which the seal member is in sliding contact,
wherein the second small-diameter portion continues to the second large-diameter portion and a fourth tube side via a second stepped portion, and
wherein the second spring is disposed between the fourth tube and the second stepped portion.

5. The front fork according to claim 3,
wherein the first shock absorber comprises a first small-diameter spring which is disposed inside the first small-diameter portion and which is configured to urge the first tube and the second tube in a compression direction.

6. The front fork according to claim 3,
wherein the first tube and the third tube are provided at positions adjacent to each other.

7. A front fork comprising:
a first shock absorber and a second shock absorber disposed respectively on both sides of a vehicle wheel,
wherein the first shock absorber comprises:
  a first tube and a second tube which are disposed respectively on a vehicle body side and a vehicle wheel side and which are configured to slide relative to each other;
  a damping force generation part which is configured to generate a damping force in accordance with a sliding of the first tube and the second tube;
  a first spring configured to urge the first tube and the second tube in a stretching direction;
  a first cylinder provided in the first tube;
  a first rod provided in the second tube; and
  a first piston which is supported by the first rod, which is configured to be in sliding contact with an inner peripheral surface of the first cylinder and which forms an oil chamber of the damping force generation part between the first cylinder and the first piston,
wherein the first cylinder comprises:
  a first large-diameter portion with which the first piston is in sliding contact; and
  a first small-diameter portion which has an outer diameter smaller than an outer diameter of the first large-diameter portion and which continues to the first large-diameter portion and a second tube side via a first stepped portion,
wherein the first shock absorber comprises a first small-diameter spring which is disposed inside the first small-diameter portion and which is configured to urge the first tube and the second tube in a compression direction,
wherein the first small-diameter spring has a coil spring disposed between the second tube and the first stepped portion,
wherein the second shock absorber comprises:
  a third tube and a fourth tube which are disposed respectively on the vehicle body side and the vehicle wheel side and which are configured to slide relative to each other;
  a second spring made of a coil spring configured to urge the third tube and the fourth tube in the stretching direction;
  a second cylinder provided in the third tube;
  a second rod provided in the fourth tube; and
  a second piston which is supported by the second rod, which is disposed inside the second cylinder and which forms an air chamber on a third tube side;
wherein the second cylinder comprises:
  a second large-diameter portion with which the second piston is in sliding contact; and
  a second small-diameter portion which has an outer diameter smaller than an outer diameter of the second large-diameter portion and which continues to the second large-diameter portion and a fourth tube side via a second stepped portion,
wherein the second shock absorber comprises a second small-diameter spring which is disposed inside the second small-diameter portion and which is configured to urge the third tube and the fourth tube in the compression direction, and
wherein the second spring is disposed between the fourth tube and the second stepped portion.

* * * * *